(No Model.)

E. A. WERNER.
PNEUMATIC TIRE.

No. 597,661. Patented Jan. 18, 1898.

WITNESSES
Ad. Fischer
F. P. Weiller.

INVENTOR
Emrick A. Werner
BY B. F. Eibler Atty.

UNITED STATES PATENT OFFICE.

EMRICK A. WERNER, OF CHICAGO, ILLINOIS.

PNEUMATIC TIRE.

SPECIFICATION forming part of Letters Patent No. 597,661, dated January 18, 1898.

Application filed December 3, 1896. Serial No. 614,287. (No model.)

*To all whom it may concern:*

Be it known that I, EMRICK A. WERNER, a citizen of the United States, residing at Chicago, in the county of Cook and State of Illinois, have invented certain new and useful Improvements in Pneumatic Tires; and I do hereby declare the following to be a full, clear, and exact description of the invention, such as will enable others skilled in the art to which it appertains to make and use the same.

My invention relates to improvements in means employed in connection with pneumatic sectional tires for bicycles or vehicles generally.

The objects of my improvement are, first, to provide for an efficient union of said sections in the form of joint-plates with or without a continuous strap or band; second, to protect said section from wear and "punctures," and, third, to enable ready and efficient repairs in the event of a puncture in or injury to one or the other of said sections. I attain these objects by the means illustrated in the accompanying drawings, in which—

Figure 1:
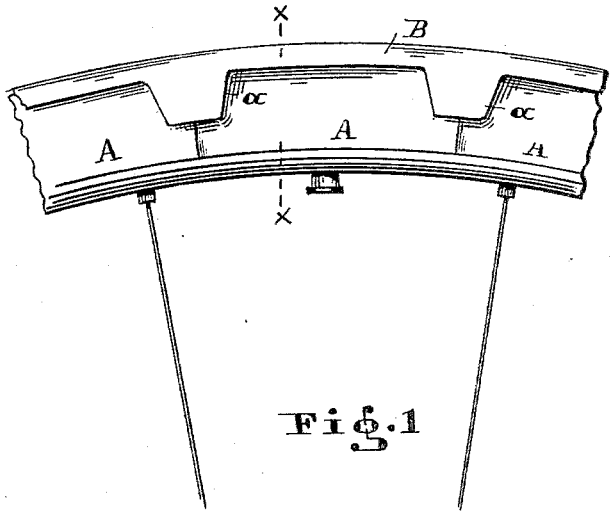
Figure 2:
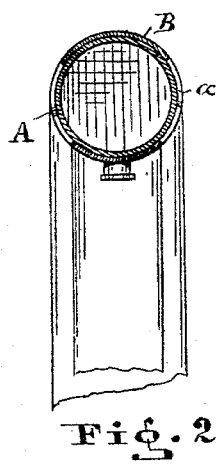
Figure 3:
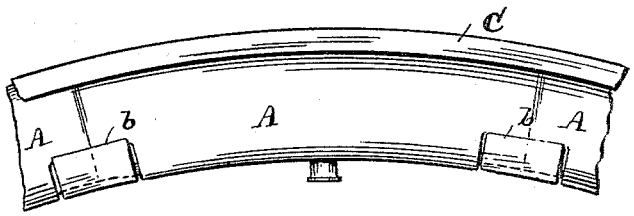
Figure 4:
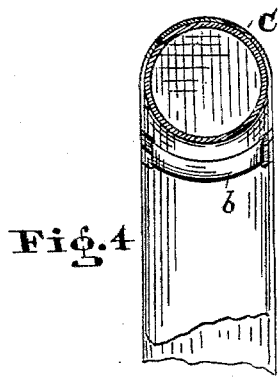
Figure 7:
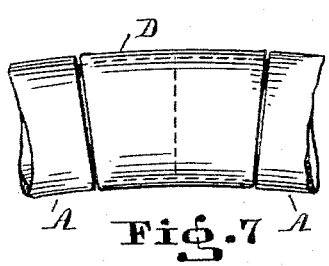
Figure 5:
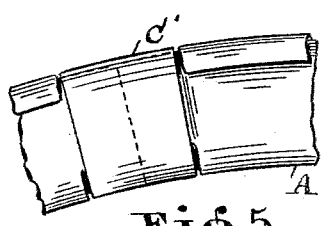
Figure 6:
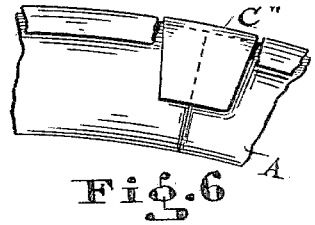

Figure 1 represents a partial view of a tire which is made up of sections and the sections being held in place by means of a continuous band and joint-plates. Fig. 2 represents a transverse sectional view of the same on line $x\ x$. (See Fig. 1.) Fig. 3 represents another partial view of a sectional tire with continuous strap and separate joint-plates. Fig. 4 is a cross-sectional view of the same. Figs. 5 and 6 illustrate the manner in which the tire or sections thereof may be repaired in case of a puncture or injury, and Fig. 7 illustrates a bandage which entirely encircles the reduced ends of the tire-sections.

Like letters of reference denote like parts in the drawings and specification.

In subdivided tires a certain number of sections A A, as shown in Fig. 1, are required to make up a tire of a particular circumference, each of the sections constituting a distinct compartment of and for the tire. For every compartment there is a valve provided for inflation of the sections independent of one from the other. Around these sections I provide a strap or continuous band B, with joint-plates or wings $a$, which partially encircle the joints of said sections, as seen in Fig. 1, or there may be a plain band or strap C, with separate joint-plates $b$, as seen in Fig. 3. In either instance does the strap serve the purpose of uniting said sections, protecting same from becoming worn, and well-nigh eliminating the chances of a puncture in or through said sections.

The joint-plates $a$ or joint-plates $b$ assist the band or strap for holding the joints of said sections in alinement, while comparatively little is added to the weight of a tire thus built up.

Any suitable substance may be used for the cementing and gluing up of the sections, band, and plates or wings.

Should by accident or other cause any of the sections become defective, then such section is simply cut out and replaced by a new one.

Replaced sections can be secured by either a joint-plate $C'$, covering the whole joint, (see Fig. 5,) or a joint-plate $C''$, covering only part of the joint. (See Fig. 6.) Such parts can easily be carried in reserve, together with one or more sections.

What I claim, and desire to secure by Letters Patent, is—

1. The combination with a wheel-tire comprising a series of independent inflatable tubes or sections of a band with joint-plates, the band surrounding and binding said sections and the plates covering the joints thereof all constructed and arranged substantially as and for the purpose set forth.

2. A sectional pneumatic wheel-tire having a band around the sections and separate plates covering the joints of said sections all constructed and arranged substantially as and for the purpose set forth.

3. In a wheel-tire consisting of a series of tubular sections each being provided with a valve to enable inflating of said sections, the combination of a band or strap and joint-plates or collars placed around or upon the joining ends of said sections for the purpose as set forth.

In testimony whereof I affix my signature in presence of two witnesses.

EMRICK A. WERNER.

Witnesses:
 BERNH. F. EIBLER,
 GUSTAV SCHMIDZ.